Patented May 11, 1937

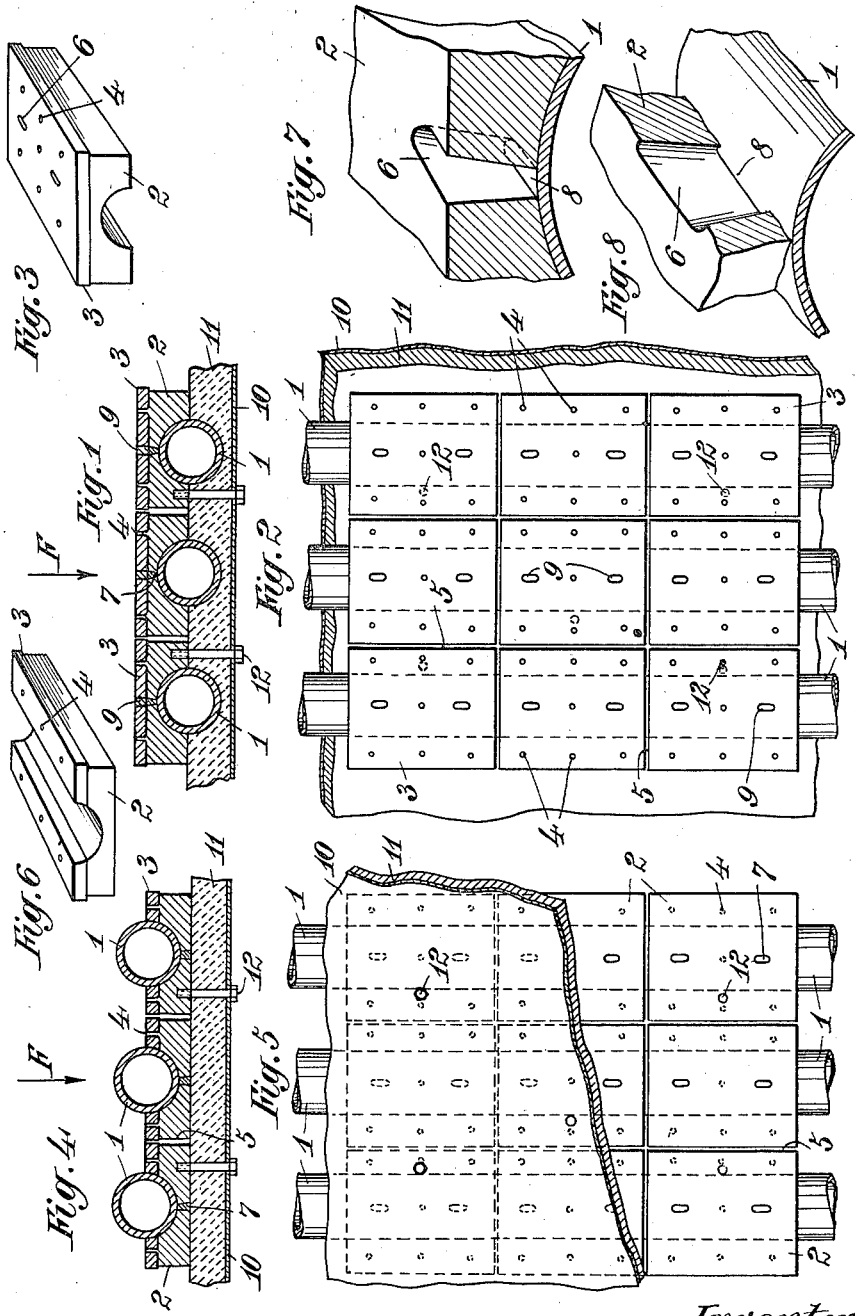

2,079,982

UNITED STATES PATENT OFFICE 2,079,982

FURNACE WALL, FURNACE-GAS BAFFLE PLATE, AND THE LIKE

Bruno Bĕlohlávek, Moravska Ostrava, Czechoslovakia

Application December 5, 1935, Serial No. 52,949
In Germany December 7, 1934

6 Claims. (Cl. 122—6)

This invention relates to furnace walls, furnace-gas baffle plates and the like for industrial furnaces, particularly in steam boilers, which consist of cooled tubes and metal wall plates secured to the same by welding, preferably with fireproof lining on the surfaces thereof that are in contact with the fire.

The invention consists in effecting the welding at holes, slots or the like in the solid metal wall plates, which are provided for the reception of welding material, thereby forming plugs on the walls of the carrying tubes.

In heat-exchange devices such as hot-water or steam heating apparatus or electrical water-heaters it has already been proposed to weld or solder pipes conveying a heating or cooling fluid between two plates, through slots in the latter filled with soldering or welding material. Most advantageously the holes or slots in the wall plates are constructed according to the invention with a taper towards the bearing surface, and are completely filled up with welding material, in such a way that the wall plates are firmly pressed on to the carrying tubes by shrinkage of the welding plugs.

Furnace walls thus mounted are distinguished by the fact that the wall plates are very simple, and can be made independently of the carrying tubes, and that there are no auxiliary members for fastening the wall plates. The welding work may be carried out on the site; it can be applied to the tubes in any position, and the production of the welds also presents no difficulties of any kind in other respects. The adhesion is very great, without the welding affecting the material of the tube walls disadvantageously. The transmission of heat from the wall plates to the tubes is good, since they are pressed strongly against one another, and it can also be enhanced in the known manner by interposing a suitable plastic layer. The plates may be secured to only one carrying tube each, but they may equally well, in case of need, be secured to several simultaneously.

Finally they are also readily exchangeable, since the welding admits without special difficulty of being removed again and renewed.

In the designing of the walls there is complete freedom. The wall plates may be fitted, according to the requirements of the furnace, on the side of the tubes facing the fire, or equally well on the side remote from the fire, in such a way that the tubes then receive a portion of the heating directly. The latter arrangement is frequently very advantageous; it cannot, however, be rendered possible with the known structures, or only with difficulty. Furthermore, furnace-chamber walls highly stressed on both sides may also easily be made with only one row of tubes and taking up only a very little space. For outer walls it is furthermore advantageous that the wall plates should present on the outside a smooth closure surface, which consequently admits of being coated in a simple manner. This outer shell can then be very easily secured to the plates themselves. Outer walls of furnaces according to the invention are illustrated in the accompanying drawing, in which Figures 1 and 2 show a wall in cross section and in side elevation from the furnace chamber respectively, the tubes being shielded against the heating, which is indicated by the arrow F;

Figure 3 shows an individual wall plate in perspective;

Figures 4 and 5 show in cross section and in outside elevation respectively a wall of corresponding construction with tubes partly heated directly; and Figure 6 shows one wall plate of this construction in perspective; and Figures 7 and 8 show the form of the slots in the wall plates for the welding.

I denotes the carrying tubes, through which water or steam flows, 2 the wall plates, preferably consisting of cast iron, and 3 the fireproof lining of the same on the surface in contact with the fire, this lining being held by pins 4, or by ribs or the like. The plates 2 are each secured only to one tube I, and are so dimensioned that they cover on each side half the space between adjacent tubes. Between the individual plates 2 are left suitable expansion joints 5. Consequently the tubes I and the wall plates 2 can expand freely.

For the purpose of securing the wall plates 2 to the carrying tubes I, the wall plates 2 are provided with holes or slots 6, which extend radially for example to the carrying tubes, and into these slots 6 welding material 7 is introduced. The slots 6 are preferably tapered towards the bearing surfaces 8, at least in their breadth, and are completely filled with the welding material 7. Upon cooling, the welding plugs 7 shrink, and then press the protective plates 2 firmly against the carrying tubes I. In the case of furnace walls with wall plates 2 covering the tubes I, as shown in Figures 1 and 2, the apertures 9 in the fireproof lining 3, which have to be left for the production of the weld 7, are preferably filled with a fireproof mortar or the like after the welding has been effected.

For the purpose of air-tight closure and for the insulation of the outside, there is fitted behind the wall plates 2 a shell of sheet-iron plates 10, with heat-proof insulating lining or filling 11. The shell 10/11 is secured directly to the wall plates 2 by screws 12, for instance hammer-headed bolts.

What I claim is:

1. A wall or gas diverting structure for industrial furnaces especially boiler plants comprising in combination a series of cooled tubes, a plurality of metal blocks being carried by these tubes and having tube embracing recesses, holes in the metal blocks, these holes extending through the blocks towards their bearing faces, plugs connecting the blocks with the tubes, these plugs being formed by introducing and welding material into the holes.

2. A wall or gas diverting structure for industrial furnaces especially boiler plants comprising in combination a series of cooled tubes, a plurality of cast iron blocks being carried by these tubes and having tube embracing recesses, holes in the blocks tapered towards their bearing faces, and plugs connecting the blocks with the tubes, these plugs being formed from welding material introduced and welded into the holes.

3. A wall or gas diverting structure for industrial furnaces especially boiler plants comprising in combination a series of tubes, a plurality of cast iron blocks being carried by these tubes, a fire-proof lining provided on the fire contacting surface of the blocks, tube embracing recesses in these blocks, holes in the same, these holes extending through the blocks towards their bearing faces and plugs connecting the blocks with the tubes, the plugs being formed from welding material introduced and welded into the holes.

4. A wall or gas diverting structure for industrial furnaces especially boiler plants comprising in combination a series of tubes, a plurality of cast iron blocks being carried by these tubes, a fire proof lining on the fire contacting surfaces of the blocks, tube embracing recesses in the fire space, holes in the blocks, these holes extending through the blocks towards their bearing faces, plugs connecting the blocks with the tubes, these plugs being formed from welding material introduced and welded into the holes.

5. A wall or gas diverting structure for industrial furnaces especially boiler plants comprising in combination a series of tubes, a plurality of cast iron blocks being carried by these tubes, a fire-proof lining on the fire contacting surfaces of the blocks, tube embracing recesses in these blocks, the tubes protruding from these recesses in the fire space, holes in the blocks, these holes extending through the blocks towards their bearing faces and plugs connecting the blocks with the tubes, these plugs being formed from welding material, the latter being introduced and welded into the holes and a heat insulating lining fastened to the blocks on the side opposite to the fire contacting surfaces.

6. A wall or gas diverting structure for industrial furnaces especially boiler plants comprising in combination a series of tubes, a plurality of cast iron blocks being carried by these tubes, a fire-proof lining on the fire contacting surfaces of the blocks, tube embracing recesses in these blocks, of holes in the blocks, these holes extending through the blocks towards their bearing faces, plugs connecting the blocks with the tubes, these plugs being formed from welding material the latter being introduced and welded into the holes, apertures in the fire-proof lining in alignment with the holes in the blocks and being filled with fire-proof mortar.

BRUNO BĚLOHLÁVEK.